United States Patent [19]

Gladstone

[11] Patent Number: 4,563,200
[45] Date of Patent: Jan. 7, 1986

[54] AIR FILTRATION

[75] Inventor: Robert S. Gladstone, Abergavenny, Wales

[73] Assignee: Coopers Filters Limited, Berkshire, England

[21] Appl. No.: 667,728

[22] Filed: Nov. 2, 1984

[30] Foreign Application Priority Data

Nov. 8, 1983 [GB] United Kingdom ............... 8329726

[51] Int. Cl.⁴ ............................................. B01D 46/04
[52] U.S. Cl. ................................................... 55/294
[58] Field of Search .......................................... 55/294

[56] References Cited

U.S. PATENT DOCUMENTS

| | | | |
|---|---|---|---|
| 2,391,534 | 12/1945 | Yerrick et al. | 55/294 |
| 2,976,953 | 3/1961 | Haas et al. | 55/294 |
| 3,315,446 | 4/1967 | King, Jr. | 55/294 |
| 3,325,978 | 6/1967 | Rymer et al. | 55/294 |
| 4,157,899 | 6/1979 | Wheaton | 55/294 |

FOREIGN PATENT DOCUMENTS

| | | | |
|---|---|---|---|
| 1024249 | 3/1966 | United Kingdom | 55/294 |
| 645682 | 9/1979 | U.S.S.R. | 55/294 |

Primary Examiner—Tim Miles
Attorney, Agent, or Firm—Cushman, Darby & Cushman

[57] ABSTRACT

A self-cleansing air cleaner comprising an air blast nozzle which is driven at constant speed through a path including at least two filter sections includes means responsive to each air blast to temporarily halt the nozzle during at least part of the duration of the blast, and to thereafter re-synchronize the nozzle movement with that of the constant speed drive.

8 Claims, 2 Drawing Figures

AIR FILTRATION

TECHNICAL FIELD OF THE INVENTION

This invention is concerned with 'self-cleansing' air cleaners of the kind in which periodic air blasts are employed to remove accretions of filtered material from the filter element. The blasts are usually applied at timed intervals to successive regions of the filter element in turn, so that eventually the whole element is treated. This continues as long as the element is in use.

The air blasts may be applied countercurrent to the normal flow direction, actually through the element itself, or they may be directed at the dirty side of the element, usually more or less at a tangent to its surface so as to displace the filtered material and cause it to fall from the surface under gravity.

THE PRIOR ART

GB Pat. No. 1024249 discloses a compact and highly efficient self-cleansing air cleaner in which a cleansing countercurrent air blast is presented to individual sections of a filter element in turn by a mechanism which also controls the blast itself. The mechanism is purely mechanical and in some critical applications where the air cleaner has to operate continuously without maintenance for extremely long periods of time there is a risk of failure, due to wear and tear on the moving parts.

OBJECTS OF THE INVENTION

It is an object of this invention to provide an improved air blast control system for a self-cleansing air cleaner. It is a further object of the present invention to provide a self-cleansing air cleaner incorporating such a system.

BRIEF DESCRIPTION OF THE INVENTION

According to the present invention an air blast control system for a self-cleansing air cleaner (as above defined) comprises means for driving an air blast nozzle with substantially constant speed around a path including at least two filter element sections, means for generating air blasts timed to coincide with the arrival of the nozzle at each of said sections in turn, together with means responsive to each blast to temporarily halt the nozzle during at least part of the duration of said blast, and to thereafter re-synchronize the nozzle movement with that of the driving means.

Preferably the driving means is an electric motor, especially of the synchronous kind which drives an assembly carrying the blast nozzle through a circular path in which it is successively presented in turn to individual filter elements sections to be cleaned. The air blasts may be generated by operation of a conventional 'quick exhaust' solenoid operated valve. Timing pulses for such a valve are preferably generated by the driving means, for example by means of an optical interrupter device directly driven by the driving means so as to automatically remain in synchronism therewith. The means responsive to each successive blast to temporarily halt the nozzle during at least part of the duration of the blast and to thereafter re-synchronise the nozzle movement with that of the driving means is preferably a magnetic coupling.

It will be appreciated that a fluid motor, fluid logic and/or fluid servo system could be used in applications where electrical operation is inconvenient or undesirable.

DESCRIPTION OF PREFERRED EMBODIMENTS OF THE INVENTION

Figure 1:
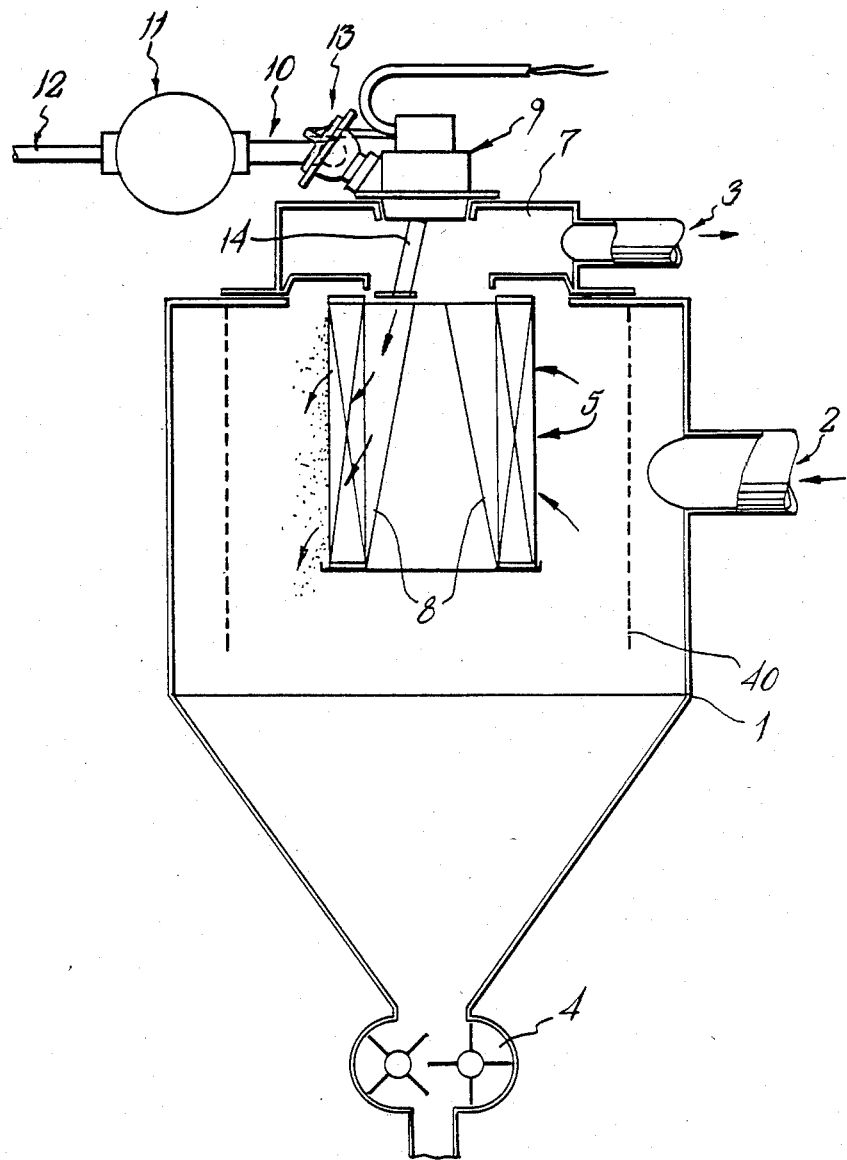
Figure 2:
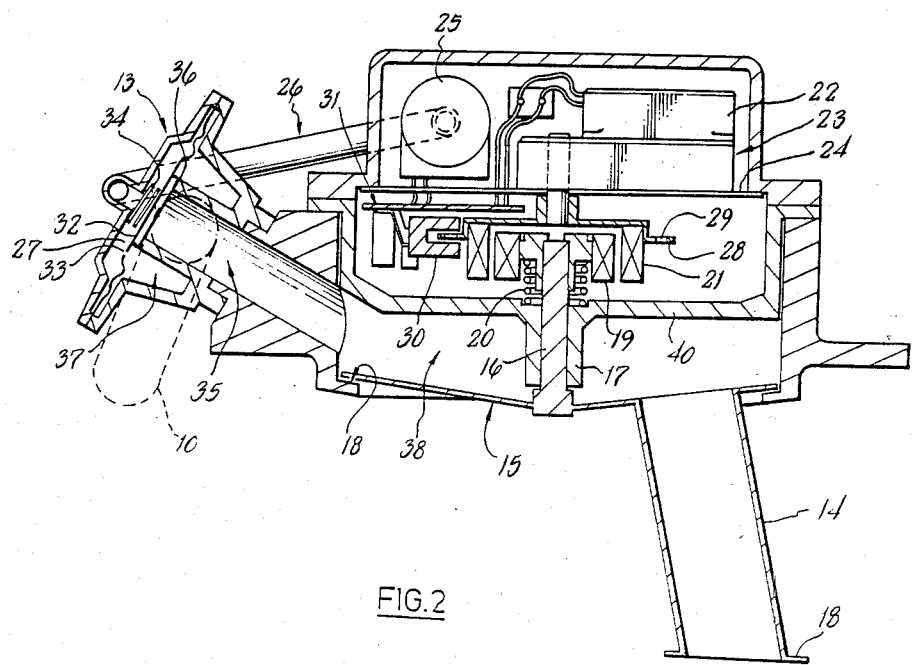

In order that the invention be better understood preferred embodiments of it will now be described by way of example with reference to the accompanying drawings, in which:

FIG. 1 is a diagrammatic cross-sectional side view of a self-cleansing air cleaner in accordance with the invention, and FIG. 2 is a similar view of part of FIG. 1, on an enlarged scale.

Similar reference numerals are used for like parts in both figures, for convenience.

Referring them to both figures, the air cleaner comprises an outer casing 1 having tangential air inlet 2 and an air outlet 3, together with a dumping device 4 comprising a pair of intersecting rotors 4. An annular skirt 40 surrounds an air filter element 5 and together with the tangential inlet 2 constitutes a cyclone-type precleaner effective to remove heavier dust particles from the inlet airstream. The air filter element 5 is located within the casing so that dirty air flows around the bottom of the skirt 40 to impinge on the outer surface of the element. The element 5 is essentially cylindrical with a series of vertically-disposed pleats, (not shown) extending from top to bottom and it is in these, on the element surface, that accretions of filtered material gradually build up during use of the air cleaner.

Communicating with the clean air side of the element (the inside) there is a housing 6 which defines an outlet chamber 7. The inside of the element 4 is provided with a series of vertically-extending baffles 8 that effectively divide the interior of the element into a series of radially directed pockets, opening upwardly into the chamber 7.

Seated in an aperture in the top of the housing 6 directly above the centre of the filter element there is an air blast control system 9 (FIG. 1). This is supplied with compressed air through a pipe 10 from a reservoir 11 connected to an air supply line 12. A proprietary quick exhaust valve 13 is interposed between pipe 10 and the blast control system 9.

Referring now to FIG. 2, the air blast control system comprises a blast nozzle 14 extending downwardly from a circular, slightly dished plate 15 into the chamber 7. The plate 15 is supported by a shaft 16 journalled in a bearing sleeve 17 for rotation about a vertical axis, so that the lower end of the nozzle 14 will travel in a circular path over each of the pocket openings in turn. The circumferential margin of the plate 15 has a running clearance relative to an annular lower casing shoulder 18. The upper end of the shaft 16 carries out part 19 of a two part magnetic coupling, and is biased upwardly by a coil spring 20 to give the running clearance just mentioned. The other part 21 of the magnetic coupling is driven by a synchronous motor 22 through a gearbox 23 mounted on a baffle 24 extending across the inside of the housing.

The baffle also carries a solenoid valve 25 which communicates through a tube 26 with a chamber 27 inside the top of the quick exhaust valve 13. The magnetic coupling part 21 also carries a disc 28 having a series of apertures 29 around its circumference. The latter passes through a proprietary infra-red sensor head 30 which detects the presence/absence of an aperture. The sensor head is mounted on a printed circuit board 31 which carries electrical circuitry (not shown) for operating the valve 25.

The valve 13 has a diaphragm 32 with a small aperture 33 and a spring 34 in chamber 27, urging the central part of the diaphragm 32 to seat sealingly on the mouth 35 of an outlet tube 36. Air (under pressure) is supplied through pipe 10 to an annular chamber 37 which surrounds the mouth.

The operation of the apparatus is as follows. The motor/gearbox, 22 and 23 rotate the coupling part 21 and the disc 28 at a substantially constant rate, typically ½ r.p.m. The coupling part 19 responds by rotating the plate 15 and the blast nozzle at the same rate. Every time an aperture 29 is detected by sensor 30, the associated circuitry briefly operates solenoid valve 25. This rapidly vents through pipe 26 the pressure in chamber 27 caused by air leakage through the aperture 33 in the diaphragm 32. The now much higher pressure in chamber 37 unseats the diaphragm 32 against the spring 34, causing a sudden blast of air to enter the tube 35 and thereafter a chamber 38 defined between the dished plate 15 and a support structure 39 for the bearing 17. This blast of air forces the margin of the plate 15 to seat onto the rim 18 by displacing the plate and shaft 16 downwardly, against the action of spring 20. This momentarily stops rotation of the plate 15 whilst the blast nozzle mouth 18 is above a filter element pocket. The air blast therefore escapes into the pocket and is applied in countercurrent to the air being filtered. This countercurrent blast displaces dirt from the element surface, from which it drops under gravity towards the dumping device 4, for periodic removal. However, because the solenoid valve is only operated momentarily, the pressure in pipe 26 and chamber 27 builds up rapidly again by virtue of leakage through the aperture 33. The spring 34 aided by the much greater surface area of the upper surface of the diaphragm exposed in the chamber 27 firmly closes the mouth 36 of the outlet pipe 35, until the next aperture 29 is detected by the sensor 30. As the pressure in chamber 38 falls again, the margin of the plate 15 unseats from the rim 18, enabling the shaft 16 to rotate again. The relative displacement of the magnetic coupling due to the momentary stopping of plate 15 is not great; the blast is deliberately of short duration and the coupling parts immediately re-assume their previous driving relationship.

The relative dispositions of the blast pipe and the apertures 29 are thus maintained, ready for the next blast into another pocket.

Because the magnetic coupling isolates the blast pipe and associated parts from drive motor/gearbox, wear and tear on the latter is minimized, if not eliminated. Because no mechanical linkages and/or ratchet mechanisms are used to index the blast pipe and operate the valve 13 synchronously therewith, there is little or no risk of mechanical failure due to repeated stop-start action and/or to the shock effect of the air blasts.

I claim:

1. An air blast control system for a self-cleansing air cleaner comprises means for driving an air blast nozzle with substantially constant speed around a path including at least two filter element sections, means for generating air blasts timed to coincide with the arrival of the nozzle at each of said sections in turn, together with means responsive to each blast to temporarily halt the nozzle during at least part of the duration of the blast and to thereafter re-synchronise the nozzle movement with that of the driving means.

2. The system of claim 1 wherein the driving means comprises an electric motor which drives the nozzle through a circular path in which it is successively presented in turn to individual filter element sections.

3. The system of claim 1 wherein the air blasts are generated by a solenoid operated valve operated in synchronism with the driving means.

4. The system of claim 3 wherein the valve is operated by electrical pulses generated by the movement of the driving means.

5. The system of claim 4 wherein the driving means drives an optical interrupter circuit which generates the pulses.

6. The system of claim 1 wherein the driving means is a fluid motor and fluid logic and/or a fluid servo are employed to drive the air blast nozzle and to generate/control the air blasts in synchronism with the movement of the driving means.

7. The system of claim 1 wherein the means responsive to each blast comprises a magnetic coupling interposed between the driving means and the blast nozzle.

8. A self-cleansing air cleaner incorporating the air blast control system of claim 1.

* * * * *